(12) United States Patent
Takeuchi et al.

(10) Patent No.: US 8,382,640 B2
(45) Date of Patent: Feb. 26, 2013

(54) CONTROL APPARATUS OF CLUTCH MECHANISM

(75) Inventors: Shinichi Takeuchi, Toyota (JP); Kotaro Hoshihara, Toyota (JP); Shinichiro Watarai, Toyota (JP); Yasuyuki Hagino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 717 days.

(21) Appl. No.: 12/450,808

(22) PCT Filed: Jun. 10, 2008

(86) PCT No.: PCT/JP2008/060923
§ 371 (c)(1),
(2), (4) Date: Oct. 14, 2009

(87) PCT Pub. No.: WO2008/153165
PCT Pub. Date: Dec. 18, 2008

(65) Prior Publication Data
US 2010/0298093 A1  Nov. 25, 2010

(30) Foreign Application Priority Data

Jun. 11, 2007  (JP) .................................. 2007-154043

(51) Int. Cl.
*B60W 10/02* (2006.01)
(52) U.S. Cl. .......................................... 477/80; 477/175
(58) Field of Classification Search .................. None
See application file for complete search history.

(56) References Cited

U.S. PATENT DOCUMENTS 5,301,781 A  4/1994  Tischer et al.
2006/0157315 A1  7/2006  Kraxner

FOREIGN PATENT DOCUMENTS

| DE | 10 2004 035 899 A1 | 3/2006 |
|---|---|---|
| EP | 1 726 841 A1 | 11/2006 |
| GB | 2 343 929 A | 5/2000 |
| JP | A-49-113058 | 10/1974 |
| JP | U-58-65433 | 5/1983 |
| JP | U-58-93530 | 6/1983 |
| JP | U-01-169621 | 11/1989 |
| JP | U-02-53533 | 4/1990 |

(Continued)

OTHER PUBLICATIONS

Office Action issued in Japanese Patent Application No. 2007-154043 dated Sep. 6, 2011 (with translation).

(Continued)

*Primary Examiner* — David D Le
*Assistant Examiner* — Erin D Bishop
(74) *Attorney, Agent, or Firm* — Oliff & Berridge, PLC (57) ABSTRACT

This apparatus is provided with a clutch mechanism 14. The clutch mechanism 14 is interposed between an engine 11 and a transmission 15, and is coupled to a clutch pedal 28. An operating mode of the clutch mechanism 14 changes in conjunction with a change of an operating position of the clutch pedal 28. In the case that an execution condition is met, the apparatus lowers a maximum operating speed of the clutch mechanism 14 in comparison with a state in which an execution condition is not met. The execution condition includes the following execution start condition that "the operating position of the clutch pedal 28 is a position setting the clutch mechanism 14 to a disengaged state, and a changing speed of the operating position of the clutch pedal 28 in an engaging direction at a time of setting the clutch mechanism 14 to an engaged state from the disengaged state is equal to or higher than a predetermined starting speed".

13 Claims, 5 Drawing Sheets

FOREIGN PATENT DOCUMENTS

| | | |
|---|---|---|
| JP | A-02-127130 | 5/1990 |
| JP | U-04-138132 | 12/1992 |
| JP | U-05-013836 | 2/1993 |
| JP | A 07-027217 | 1/1995 |
| JP | A-09-156398 | 6/1997 |
| JP | A 09-269019 | 10/1997 |
| JP | A 2003-161336 | 6/2003 |
| JP | A-2004-076897 | 3/2004 |
| JP | A-2005-082041 | 3/2005 |
| JP | A-2006-193143 | 7/2006 |
| JP | A-2006-256479 | 9/2006 |
| WO | WO 2005/090812 A1 | 9/2005 |

OTHER PUBLICATIONS

Office Action issued in Japanese Patent Application No. 2007-154043 dated Jun. 7, 2011 (with translation).

CONTROL APPARATUS OF CLUTCH MECHANISM

FIELD OF THE INVENTION

The present invention relates to a control apparatus of a clutch mechanism provided between a power source and a transmission.

BACKGROUND OF THE INVENTION

In order to disconnect or connect power transmission from a power source such as a vehicle internal combustion engine to a transmission, a clutch mechanism is provided between the power source and the transmission (refer to Patent Document 1). The clutch mechanism generally has a flywheel attached to an output shaft of the power source, and a clutch disc attached to an input shaft of the transmission. The clutch mechanism is coupled to a clutch pedal provided within a passenger compartment via a hydraulic piping or a cable. The clutch pedal is held at a non-depressed position by being normally urged by an urging force of a spring.

When the clutch pedal is not depressed, the clutch disc is pressed against the flywheel. At this time, friction force is generated between the clutch disc and the flywheel. Further, by means of the friction force, the clutch mechanism is connected so as to form an engaged state, and the power is transmitted from the power source to the transmission.

If the clutch pedal is depressed, the clutch disc is released from a state in which the clutch disc is pressed against the flywheel. At this time, the friction force generated between the clutch disc and the flywheel is reduced, and the clutch disc comes away from the flywheel. Accordingly, the clutch mechanism is disconnected so as to form a disengaged state, and the power transmission from the power source to the transmission is disconnected.

The clutch mechanism is activated through depressing operation of the clutch pedal by a driver. Accordingly, if depression of the clutch pedal is discontinued because a foot depressing the clutch pedal is removed from the clutch pedal or has slid in a lateral direction, the clutch pedal is rapidly returned to the non-depressed position, and the clutch mechanism rapidly shifts from the disengaged state to the engaged state.

Further, immediately after the clutch mechanism shifts from the disengaged state to the engaged state, the actual transmission torque transmitted to the input shaft of the transmission is changed as follows. The actual transmission torque temporarily overshoots a torque transmitted to the input shaft of the transmission at a steady state when the torque is fixed, that is, a steady state transmission torque. Thereafter, the actual transmission torque repeats decrease and increase at a predetermined period, the amplitude of the actual transmission torque becomes smaller and smaller, and the actual torque finally coincides with the steady state transmission torque.

At the transition as mentioned above, the greater the changing speed of the operating state of the clutch mechanism, that is, the greater the engaging speed of the clutch mechanism, the greater the amount by which the steady state transmission torque is overshot becomes, and the peak value of the actual transmission torque becomes large. Accordingly, if the clutch mechanism rapidly shifts from the disengaged state to the engaged state, the peak value of the actual transmission torque becomes large. Therefore, in order to secure the durability of a drive system including the transmission, it is necessary to set the strength of the drive system in correspondence to the peak value of the actual transmission torque. This reduces the flexibility of the design of the characteristic of the drive system.

If a system having a clutch mechanism of a small maximum engaging speed is employed, it is possible to reduce the peak value of the actual transmission torque. However, in this case, since the engaging speed is lowered in conditions other than the condition mentioned above, the response of the clutch mechanism is reduced.

Patent Document 1: Japanese Laid-Open Patent Publication No. 7-27217

SUMMARY OF THE INVENTION

An objective of the present invention is to provide a control apparatus of a clutch mechanism which lowers a peak value of an actual transmission torque while suppressing a reduction of response.

In order to achieve the objective mentioned above, and in accordance with a first aspect of the present invention, there is provided a control apparatus of a clutch mechanism that is coupled to a clutch operating member as well as being interposed between a power source and a transmission, and changes its operating mode in response to a change of an operating position of the clutch operating member. The control apparatus is provided with a maximum speed lowering means. In the case that an execution condition including an execution start condition that "an operating position of the clutch operating member is a position setting the clutch mechanism to a disengaged state, and a changing speed of the operating position of the clutch operating member in a engaging direction at a time of setting the clutch mechanism to an engaged state from the disengaged state becomes equal to or higher than a predetermined starting speed" is met, the maximum speed lowering means lowers the maximum operating speed of the clutch mechanism in comparison with a state in which the execution condition is not met.

In accordance with the structure mentioned above, when the execution condition is met, in other words, when there is a risk that the clutch mechanism rapidly shifts from the disengaged state to the engaged state, it is possible to keep down the operating speed of the clutch mechanism. Accordingly, it is possible to lower the peak value of the actual transmission torque. Further, when the execution condition is not met, the maximum operating speed of the clutch mechanism is increased to suppress a reduction of the response.

In the control apparatus of the clutch mechanism mentioned above, the execution condition includes an execution stop condition that one of the following conditions is satisfied: "the operating position of the clutch operating member is the position setting the operating state of the clutch mechanism to the engaged state, and the changing speed of the operating position of the clutch operating member in the engaging direction becomes less than the predetermined stopping speed" and "the clutch operating member is in the operated state".

In the control apparatus of the clutch mechanism mentioned above, the execution condition includes the following execution stop condition that "the operating position of the clutch operating member is the position setting the clutch mechanism to the engaged state, and the changing speed of the operating position of the clutch operating member in the engaging direction becomes less than the predetermined speed".

In the control apparatus of the clutch mechanism mentioned above, the execution condition includes the following execution stop condition that "the clutch operating member is in the operated state".

It is possible to determine that the clutch mechanism has got out of the situation where the clutch mechanism rapidly shifts from the disengaged state to the engaged state, in other words, from a situation where it is desirable to execute the process of suppressing the maximum operating speed of the clutch mechanism so as to suppress the peak value of the actual transmission torque, under the condition that "the operating position of the clutch operating member is the position setting the clutch mechanism to the engaged state, and the changing speed of the operating position of the clutch operating member in the engaging direction becomes less than the predetermined speed".

In the case that "the clutch operating member is activated", in other words, in the case that the clutch operating member touches the body of the driver, it is possible to determine that the clutch mechanism has got out of the situation where it is desirable to execute the process mentioned above, by determining that the operating speed of the clutch operating member is sustained at a comparatively low level by the driver.

In this regard, in accordance with the present invention, in the case that the clutch mechanism has got out of the situation where it is desirable to execute the process mentioned above, it is possible to stop the execution of the process at a suitable timing.

In the control apparatus of the clutch mechanism mentioned above, the maximum speed lowering means changes the operating position of the clutch operating member at a predetermined speed to a predetermined position setting the clutch mechanism to a half-engaged state. Then after keeping the operating position at a predetermined position for a predetermined period corresponding to one half of a fluctuation period at a time when the actual transmission torque periodically fluctuates in accordance with the change of the actual transmission torque transmitted from the power source to the transmission through the clutch mechanism, the control apparatus changes again the operating position at a predetermined speed.

In accordance with the structure mentioned above, it is possible to generate two fluctuations of inverted positive and negative phases as the periodical fluctuations of the actual transmission torque. Specifically, it is possible to generate a fluctuation generated at a time of changing the operating position of the clutch operating member to the predetermined position, and a fluctuation generated at a time of changing the operating position again. Accordingly, it is possible to offset a part of each fluctuation by causing the fluctuations to interfere with each other. Therefore, it is possible to suppress the peak value of the actual transmission torque.

As the predetermined speed, it is possible to employ the maximum changing speed in addition to the changing speed at a time when the execution condition is not met, that is, a speed lower than the maximum changing speed.

In the control apparatus of the clutch mechanism mentioned above, the predetermined position corresponds to the operating position in which the clutch mechanism can transmit over one half of the maximum value of the steady state transmission torque transmitted from the power source to the transmission at the steady state when the actual transmission torque is fixed.

As mentioned above, the actual transmission torque primarily overshoots the steady state transmission torque, and thereafter repeats increasing and decreasing. The amplitude of the actual transmission torque becomes smaller and smaller. The actual transmission torque finally coincides with the steady state transmission torque. Accordingly, after somewhat damping its amplitude, the periodical fluctuation (the first fluctuation) of the actual transmission torque generated at a time of changing the operating position of the clutch operating member to the predetermined position interferes with the periodical fluctuation (the second fluctuation) of the actual transmission torque generated at a time of changing the operating position of the clutch operating member again.

If the amplitudes at an initial stage of the first fluctuation and the second fluctuation are made equal, the amplitude of the first fluctuation becomes larger than the amplitude of the second fluctuation at a time when both fluctuations interfere with each other. In order to suppress the peak value of the actual transmission torque, it is desirable that the amplitudes of the fluctuations coincide with each other at a time when both fluctuations interfere with each other.

In this regard, in accordance with the structure mentioned above, the amplitude at the initial stage when the first fluctuation is generated can be made larger than the amplitude at the initial stage when the second fluctuation is generated, under the state that the clutch mechanism comes to the engaged state, and the torque equal to the maximum value of the steady state transmission torque is transmitted at the steady state when the actual transmission torque is fixed, in other words, under the state that there is a risk that the peak value of the actual transmission torque becomes maximum. Accordingly, since the amplitudes of both fluctuations substantially coincide at a time when the first fluctuation interferes with the second fluctuation under such a situation, whereby the amplitudes of the fluctuations are offset, it is possible to effectively suppress the peak value of the actual transmission torque.

In the control apparatus of the clutch mechanism mentioned above, the transmission has an oil lubricating system carrying out lubrication through oil feed to the inside of the transmission. The maximum speed lowering means changes the predetermined position in correspondence to the viscosity of the oil.

The transmission has a sliding portion such as a bearing portion of an input shaft and the like, and a friction force is generated in the sliding portion. The larger the friction force is, the more largely the fluctuation of the actual transmission torque is damped, so that the amplitude of the first fluctuation becomes small at an early stage. Accordingly, in order to reliably cause the amplitudes of the first and second fluctuations to coincide each other, it is desirable to set the predetermined position to a position close to the engaged state, in accordance with an increase in the friction force. The higher viscosity of the lubricating oil in the interior of the transmission, the larger the friction force generated in the sliding portion becomes.

In accordance with the structure mentioned above, it is possible to bring the amplitude of the first fluctuation into line with the amplitude of the second fluctuation by changing the predetermined position in correspondence to the friction force applied to the sliding portion. Accordingly, it is possible to more effectively suppress the peak value of the actual transmission torque.

In the control apparatus of the clutch mechanism mentioned above, it is possible to determine that the higher the temperature of the oil, the lower the viscosity of the oil is, and it is possible to determine that the greater the degree of deterioration of the oil, the lower the viscosity of the oil is.

In the control apparatus of the clutch mechanism mentioned above, the maximum speed lowering means changes the predetermined position in correspondence to the magnitude of the generated torque of the power source.

The friction force generated in the sliding portion is changed in correspondence to the magnitude of the actual transmission torque, and the actual transmission torque is changed in correspondence to the magnitude of the generated torque of the power source. In accordance with the structure mentioned above, it is possible to bring the amplitude of the first fluctuation into line with the amplitude of the second fluctuation by changing the predetermined position in correspondence to the friction force applied to the sliding portion, and it is possible to more effectively suppress the peak value of the actual transmission torque.

In the control apparatus of the clutch mechanism mentioned above, the transmission is constituted by a multistage transmission in which a plurality of transmission speed gears can be selectively switched. The maximum speed lowering means changes the predetermined period in correspondence to the selected transmission speed gear.

In the multistage transmission, the rigidity of the torque transmission path along which the actual transmission torque is transmitted is changed in correspondence to the selected transmission speed gear. In accordance with this, the period in which the actual transmission torque fluctuates is changed at transition. Further, as mentioned above, two opposite fluctuations having positive and negative phases are generated as the periodical fluctuation of the actual transmission torque by setting the predetermined time maintaining the operating position of the clutch operating member to the period corresponding to one half of the fluctuation cycle of the actual transmission torque.

In accordance with the structure mentioned above, it is possible to set the predetermined period to the period corresponding to one half of the actual fluctuation cycle in correspondence to the change of the fluctuation cycle of the actual transmission torque at the transition. Accordingly, it is possible to reliably offset the amplitudes of two fluctuations, and it is possible to effectively suppress the peak value of the actual transmission torque.

The control apparatus of the clutch mechanism mentioned above is further provided with a friction type brake mechanism for forcibly stopping the rotation of the output shaft of the transmission. The maximum speed lowering means changes the predetermined period in correspondence to the presence or absence of the operation of the brake mechanism.

If the rotation of the output shaft of the transmission is forcibly stopped by the operation of the friction type brake mechanism, the rigidity of the torque transmission path becomes higher, and the period in which the actual transmission torque fluctuates at the transition becomes shorter.

In accordance with the structure mentioned above, it is possible to set the predetermined period to the period corresponding to one half of the actual fluctuation cycle of the actual transmission torque at transition, in correspondence to the operating state of the brake mechanism, and it is possible to suppress the peak value of the actual transmission torque by reliably offsetting the amplitudes of two fluctuations.

In the control apparatus of the clutch mechanism mentioned above, the clutch mechanism and the clutch operating member are coupled via a hydraulic actuation system. The hydraulic actuation system is constituted by a release cylinder brought into contact with the clutch mechanism, a master cylinder brought into contact with the clutch operating member, and a piping connecting a liquid chamber of the release cylinder and a liquid chamber of the master cylinder. A clutch fluid fills the interior of the hydraulic actuation system. A control valve for changing a passage cross-sectional area of the piping is provided in the piping. The maximum speed lowering means lowers the maximum operating speed of the clutch mechanism by making small an opening degree of the control valve.

In accordance with the structure mentioned above, in the system in which the clutch operating member and the clutch mechanism are coupled via the hydraulic piping, it is possible to suppress the maximum operating speed of the clutch mechanism by limiting a flow rate of the clutch fluid passing through the hydraulic piping.

In the control apparatus of the clutch mechanism mentioned above, the power source is constituted by a vehicle internal combustion engine, and the transmission constructs a vehicle driving system including a drive shaft.

In accordance with the structure mentioned above, it is possible to keep down the necessary strength of the vehicle driving system. Accordingly, it is possible to increase the flexibility of design of the characteristic of the vehicle driving system high.

DETAILED DESCRIPTION OF THE PREFERRED EMBODIMENTS

A description will be given below of a control apparatus of a clutch mechanism according to an embodiment of the present invention.

Figure 1:
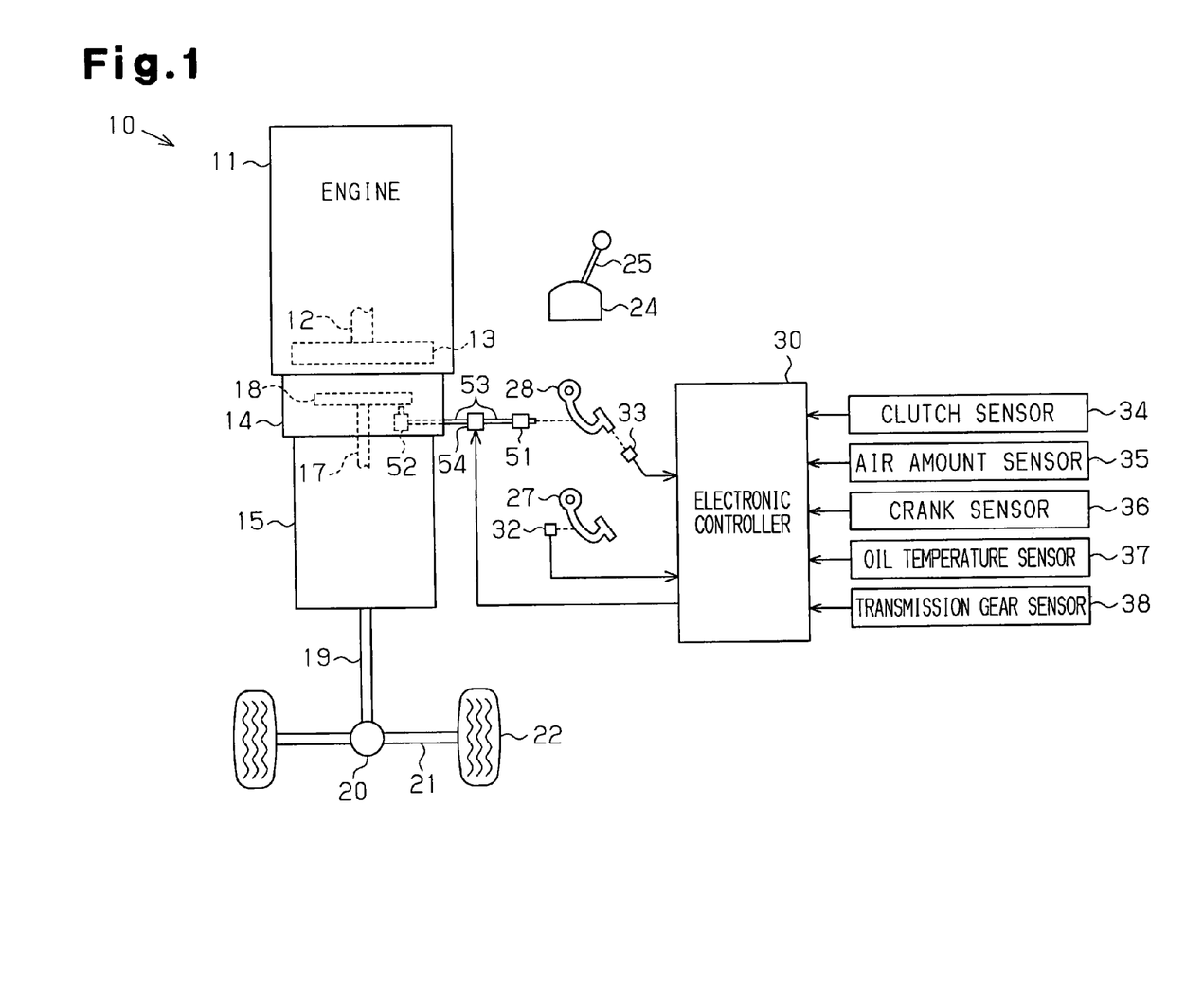
FIG. 1 is a schematic view showing a vehicle to which a control apparatus of a clutch mechanism in accordance with an embodiment of the present invention.

As shown in FIG. 1, an engine 11 is mounted as a power source on a vehicle 10. A flywheel 13 is attached to a crankshaft 12 serving as an output shaft of the engine 11. A transmission 15 is connected to the flywheel 13 via a clutch mechanism 14. The clutch mechanism 14 transmits a rotating torque of the crankshaft 12 to the transmission 15, and disconnects torque transmission.

As the transmission 15, there is employed a parallel gear type manual transmission having five forward gears and one reverse gear. The transmission 15 is provided with an input shaft 17 and an output shaft (not shown). The input shaft 17 of the transmission 15 is coupled to a clutch disc 18. The output shaft of the transmission 15 is connected to drive wheels 22 via a drive shaft 19, a differential gear 20, an axle 21. Rotation of the output shaft of the transmission 15 is transmitted to the drive wheels 22 through the members 19, 20 and 21. The transmission 15 constructs a part of a vehicle driving system.

The transmission 15 is provided with plural pairs of transmission gear trains (transmission gears), and a plurality of sleeves. A shift device 24 for switching the transmission gear of the transmission 15 is installed in the vicinity of a driver seat. The shift device 24 is provided with a shift lever 25 which can be move along a shift gate (not shown). A sleeve of the transmission 15 is moved along an axial direction of the output shaft on the basis of an operation of the shift lever 25. Since the gears are engaged on the basis of a movement of the sleeve, a power in a particular transmission gear train is transmitted. If each of the sleeves is moved to an intermediate (neutral) position of the pairs of transmission gear trains, the power transmission in each of the transmission gear train is disconnected.

The vehicle 10 is provided with various sensors and switches for detecting operating states of the vehicle 10 and the engine 11. The driver seat is provided with a brake switch 32 for detecting whether the brake pedal 27 is being depressed, a contact sensor 33 for detecting a contact of a driver's foot with the clutch pedal 28, and the like. Further, the vehicle 10 is provided with a clutch sensor 34 for detecting the depressed amount of the clutch pedal 28. The clutch sensor 34 detects a clutch pedal depression degree CRA, that is, the operating position of a piston of the release cylinder 52. The engine 11 is provided with an air amount sensor 35 for detecting the amount of an air drawn into a combustion chamber, that is, an intake air amount GA, a crank sensor 36 for detecting the rotating speed of the crankshaft 12, that is, an engine speed NE, and the like. The transmission 15 is provided with an oil temperature sensor 37 for detecting a temperature THO of lubricating oil fed into the transmission 15, a transmission gear sensor 38 for detecting the selected transmission speed gear, and the like.

The apparatus in accordance with the present embodiment is provided with an electronic controller 30. The electronic controller 30 is provided with a microcomputer, and receives detection signals from the sensors and the switches. The electronic controller 30 carries out various computing processes on the basis of the signals from the sensors and the switches, and executes various controls on the basis of results of computations. In the present embodiment, a known dry-type single plate friction clutch is used as the clutch mechanism 14.

A description will be given below of a specific structure of the clutch mechanism 14 with reference to FIG. 2.

Figure 2:
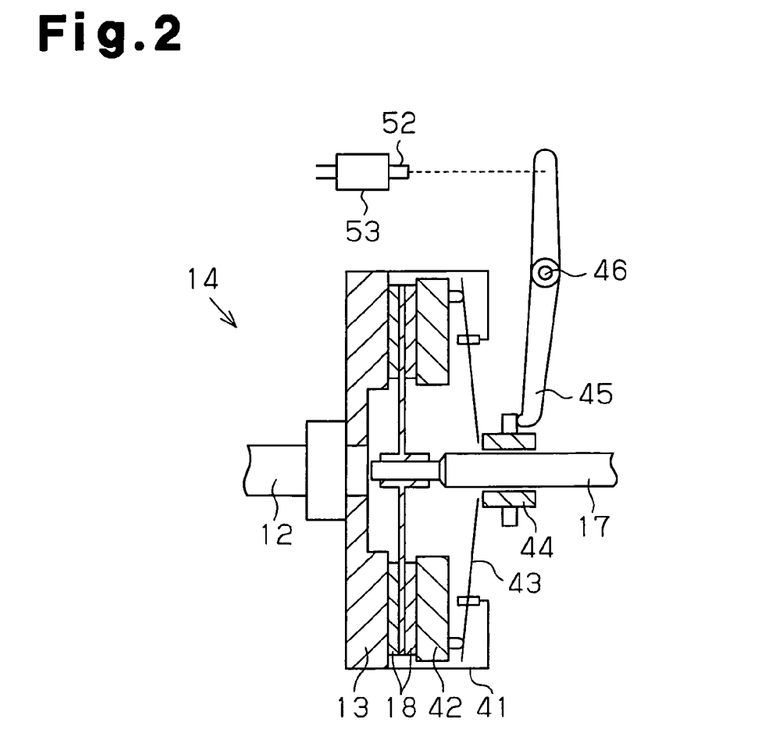
FIG. 2 is a side cross-sectional view showing a clutch mechanism mounted to the vehicle.

As shown in FIG. 2, a clutch cover 41 is attached to the flywheel 13. A clutch disc 18 is splined to the input shaft 17 of the transmission 15. The clutch disc 18 can slide along an axial direction (a lateral direction in FIG. 2) while rotating together with the input shaft 17.

A pressure plate 42 is arranged between the clutch disc 18 and the clutch cover 41. The pressure plate 42 is pressed against the flywheel 13 by an outer end of a diaphragm spring 43. On the basis of this pressing, a friction force is generated between the clutch disc 18 and the pressure plate 42, and between the flywheel 13 and the clutch disc 18. On the basis of these friction forces, the clutch mechanism 14 comes to a connected (engaged) state, and the flywheel 13, the clutch disc 18 and the pressure plate 42 are integrally rotated. In this way, the rotating torque is transmitted from the engine 11 to the transmission 15 via the clutch mechanism 14. It is possible to express the degree of power transmission on the basis of the magnitude of the actual transmission torque at the time.

The release bearing 44 is attached to the input shaft 17 of the transmission 15 so as to be slidable along the axial direction. The release bearing 44 regulates the degree of the power transmission and disconnects the power transmission. A release fork 45 is provided in the vicinity of the release bearing 44. The release fork 45 is rotatably supported around a shaft 46. A first end portion (a lower end in FIG. 2) of the release fork 45 is brought into contact with the release bearing 44.

The clutch mechanism 14 is coupled to a clutch pedal 28 (FIG. 1) via a hydraulic actuating system. The clutch mechanism 14 is switched to a disengaged state and an engaged state in conjunction with a depressing operation of the clutch pedal 28. A spring (not shown) normally urging the clutch pedal 28 so as to hold it at a non-depressed position is provided in the vicinity of the clutch pedal 28.

A master cylinder 51 is provided in the vicinity of the clutch pedal 28. The master cylinder 51 is constituted by a piston and a liquid chamber (a cylinder portion). A distal end of the piston is coupled to the clutch pedal 28. The piston of the master cylinder 51 protrudes or retracts with respect to the cylinder portion in accordance with an operation of the clutch pedal 28.

A release cylinder 52 is provided in the vicinity of the clutch mechanism 14. The release cylinder 52 is constituted by a piston and a liquid chamber (a cylinder portion). A distal end of the piston of the release cylinder 52 is coupled to a second end portion (an upper end in FIG. 2) of the release fork 45.

The cylinder portion of the master cylinder 51 and the cylinder portion of the release cylinder 52 communicate with each other through a clutch piping 53. Clutch fluid is supplied to fill the cylinder portion of the master cylinder 51, the cylinder portion of the release cylinder 52, and the interior of the clutch piping 53. A control valve 54 is provided in the middle of the clutch piping 53. On the basis of an opening and closing control of the control valve 54, the cylinder portion of the release cylinder 52 and the cylinder portion of the master cylinder 51 through the clutch piping 53 are connected and disconnected. The opening and closing control of the control valve 54 is executed by the electronic controller 30.

The clutch mechanism 14 operates as follows.

First, if the clutch pedal 28 is depressed, the piston of the master cylinder 51 retracts into the cylinder portion. In connection with this, the piston of the release cylinder 52 protrudes from the cylinder portion. Accordingly, the release fork 45 (FIG. 2) is rotated around the shaft 46, and the release bearing 44 is pushed toward the flywheel 13. At this time, the release bearing 44 is moved in the same direction as the rotating direction of the release fork 45. Accordingly, an inner end of the diaphragm spring 43 is elastically deformed in the same direction as the rotating direction of the release fork 45. As a result, a pressing force against the pressure plate 42 by the diaphragm spring 43 is weakened, and the friction force is reduced between the clutch disc 18 and the pressure plate 42, and between the flywheel 13 and the clutch disc 18. The friction force is changed in correspondence to the depressing operation of the clutch pedal 28 (FIG. 1), as mentioned above.

For purposes of illustration, the operating state of the clutch mechanism 14 is divided into three states: an engaged state, a half clutch state and a disengaged state.

In the engaged state, the friction force is large; the pressure plate 42, the clutch disc 18 and the flywheel 13 are integrally rotated; and the power is transmitted from the engine 11 to the transmission 15. The actual transmission torque at this time indicates a maximum value.

In the half clutch state, the friction force is "middle level", and the flywheel 13, the clutch disc 18, and the pressure plate 42 are connected while slipping. The actual transmission torque at this time is smaller than the value in the engaged state.

In the disengaged state, the friction force is small, and the clutch mechanism 14 is disengaged. In other words, the rotation of the flywheel 13 is not transmitted to the clutch disc 18, and the power is not transmitted to the transmission 15 from the engine 11. The actual transmission torque at this time is further smaller than the value in the half clutch state.

As mentioned above, if depression of the clutch pedal 28 is discontinued because a foot depressing the clutch pedal 28 is removed from the clutch pedal 28 or has slid in a lateral direction, the clutch pedal 28 is rapidly returned to the non-depressed position, and the peak value of the actual transmission torque at the transition becomes large. Accordingly, in order to secure the durability of the vehicle driving system, it is necessary to set the strength of the vehicle driving system in correspondence to the peak value of the actual transmission torque, thereby reducing the flexibility of design the characteristic of the vehicle driving system.

Taking this point into consideration, in the present embodiment, in the case that the changing speed is large at a time when the clutch mechanism 14 shifts from the disengaged state to the engaged state, a peak suppressing process suppressing the peak value of the actual transmission torque is executed through the opening and closing control of the control valve 54. In the present embodiment, the peak suppressing process serves as maximum speed lowering means lowering the maximum operating speed of the clutch mechanism.

Figure 3:
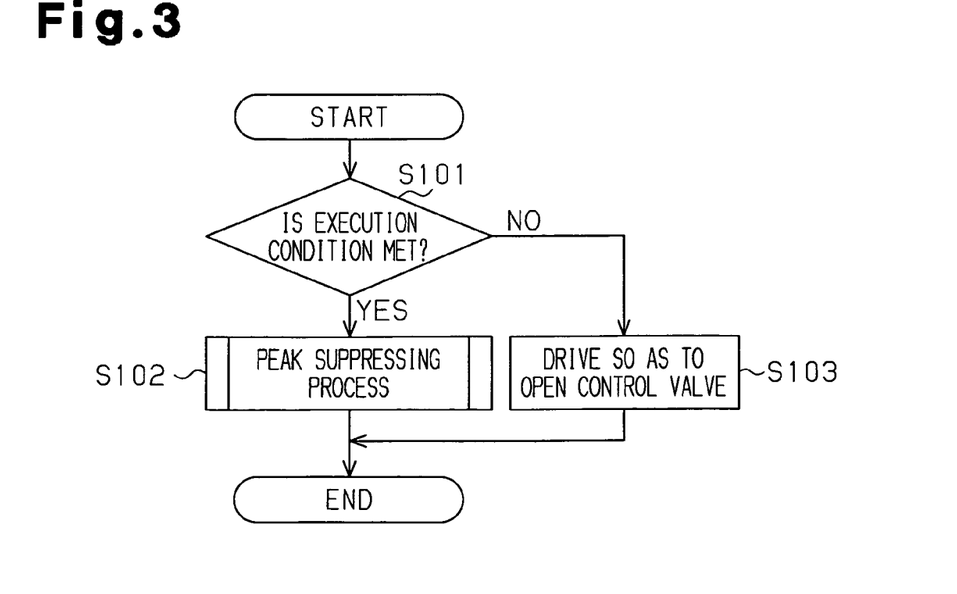
FIG. 3 is a flowchart showing a peak suppressing process.

As shown in FIG. 3, the peak suppressing process is executed (step S102) under condition that an execution condition is met (YES in step S101). On the other hand, in the case that the execution condition is not met (NO in step S101), the peak suppressing process is not executed, and the opened state of the control valve 54 is maintained (step S103).

The execution condition mentioned above is determined to be met in the case that an execution stop condition is not met after the following execution start condition is met.

Figure 4:
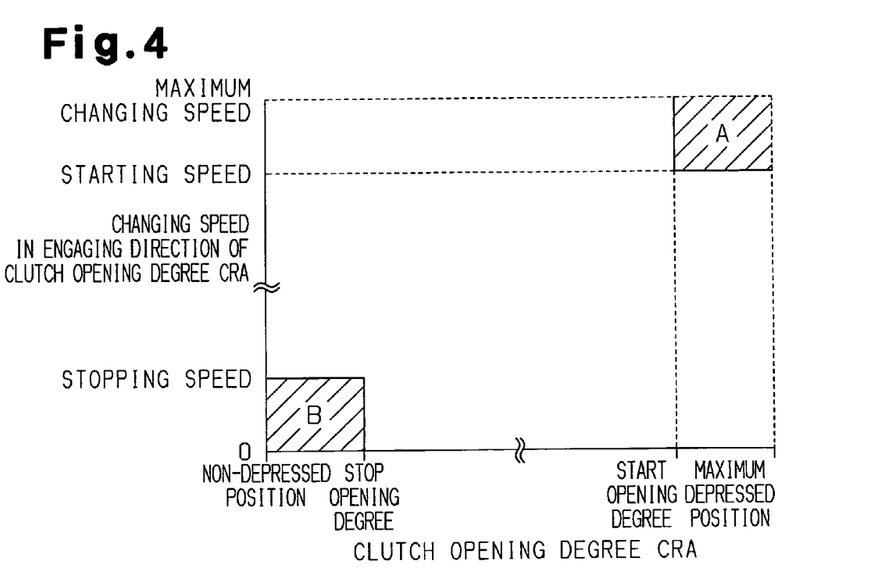
FIG. 4 is a graph showing a relationship between an operating region and an execution condition of a clutch pedal.

The execution start condition is determined to be met in the case that the following Condition i and Condition ii are both met. In detail, as shown in FIG. 4, in the case that the operating region of the clutch pedal 28 is a region indicated by "A", it is determined that the execution start condition is met.

(Condition i) A clutch pedal depression degree CRA is a pedal depression degree setting the clutch mechanism 14 to the disengaged state. Specifically, the clutch pedal depression degree CRA is equal to or greater than a predetermined starting depression degree. In other words, the clutch pedal depression degree CRA is equal to or greater than a pedal depression degree corresponding to a position which is slightly closer to the non-depressed position than the maximum depressed position of the clutch pedal 28.

(Condition ii) The changing speed of the clutch pedal depression degree CRA in an engaging direction in which the clutch mechanism 14 comes to the engaged state from the disengaged state, that is, a returning direction of the clutch pedal 28 becomes equal to or more than a predetermined starting speed. Specifically, a reducing speed of the clutch pedal depression degree CRA is equal to or more than a predetermined starting speed. In other words, the reducing speed of the clutch pedal depression degree CRA is equal to or more than a speed which is slightly lower than the maximum changing speed of the clutch pedal depression degree CRA.

When it is determined, on the basis of the fact that the execution starting condition mentioned above is met, that there is a risk that the clutch mechanism 14 may rapidly shift from the disengaged state to the engaged state, in other words, a stats that it is desirable to execute the peak suppressing process, the execution of the peak suppressing process is started.

The execution stop condition is determined to be met in the case that the following Condition iii and Condition iv are both met or in the case that Condition v is met. The case that Condition iii and Condition iv are both met refers to a case that the operating region of the clutch pedal 28 enters a region shown by a region "B" in FIG. 4.

(Condition iii) The clutch pedal depression degree CRA is a pedal depression degree setting the clutch mechanism 14 to the engaged state. Specifically, the clutch pedal depression degree CRA is equal to or less than a predetermined stopping depression degree. In other words, the clutch pedal depression degree CRA is equal to or less than a pedal depression degree corresponding to a position which is slightly closer to the maximally depressed position than the non-depressed position of the clutch pedal 28.

(Condition iv) The changing speed of the clutch pedal depression degree CRA in the engaging direction at a time when the clutch mechanism 14 comes to the engaged state from the disengaged state is less than a predetermined stopping speed. Specifically, the changing speed of the operating position in the returning direction of the clutch pedal 28 is less than a predetermined stop speed, that is, less than a speed which is slightly larger than "0".

(Condition v) The clutch pedal 28 is being operated. Specifically, the clutch pedal 28 is contacting the body of the driver.

In accordance with the execution stop condition mentioned above, in the case that Condition iii and Condition iv are both met, it is determined that the clutch mechanism 14 is already in the engaged state, and it is determined that the clutch mechanism 14 has got out of the situation where it is desirable to execute the peak suppressing process. Further, in the case that Condition v is met, it is determined that the changing speed of the clutch pedal depression degree CRA is maintained relatively low by the driver, and it is determined that the clutch mechanism 14 has got out of the situation where it is desirable to execute the peak suppressing process. In the present embodiment, the execution of the peak suppressing process is stopped at a suitable timing on the basis of the determination mentioned above.

On the other hand, in the case that Condition v is met, it is determined that the operating speed in the returning direction of the clutch pedal 28 is maintained relatively low by the driver, and it is determined that the clutch mechanism has got out of the situation where it is desirable to execute the process mentioned above.

Suitable values are determined as the predetermined starting depression degree, the predetermined starting speed, the predetermined stopping depression degree and the predetermined stopping speed in each of the above conditions, and these values are previously stored in the electronic controller 30.

A description will be given below of an executing procedure of the peak suppressing process.

Figure 5:
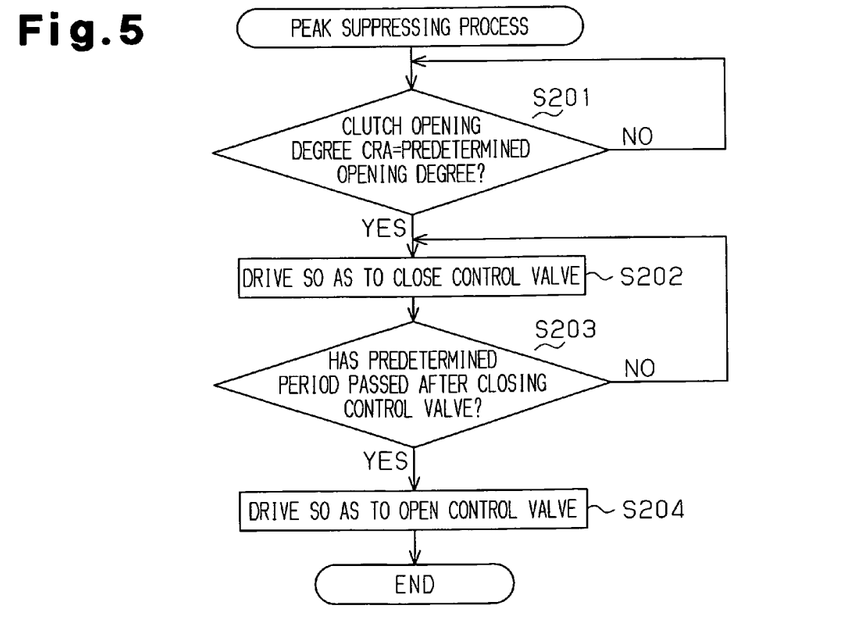
FIG. 5 is a flowchart showing a procedure of the peak suppressing process.

FIG. 5 is a flowchart showing a specific executing procedure of the peak suppressing process.

As shown in FIG. 5, in this process, it is first determined whether the clutch pedal depression degree CRA is equal to a predetermined pedal depression degree (step S201). In the case that the clutch pedal depression degree CRA is greater than the predetermined pedal depression degree (NO in step S201), the opened state of the control valve 54 is maintained. At this time, the operating state of the clutch mechanism 14, that is, the depressed position of the clutch pedal 28 shifts at the maximum speed.

The predetermined pedal depression degree is a pedal depression degree setting the clutch mechanism 14 to the half engaged state. In other words, the predetermined pedal depression degree is a pedal depression degree capable of transmitting the torque more than one half of the steady state transmission torque by the clutch mechanism 14, for example, a pedal depression degree corresponding to 52% in the case that the maximum value of the steady state transmission torque is set to "100%". The steady state transmission torque is a torque transmitted to the input shaft 17 of the transmission 15 at the steady state when the actual transmission torque is fixed. The predetermined pedal depression degree is previously determined on the basis of the maximum value of the steady state transmission torque, and is stored in the electronic controller 30.

Thereafter, if the clutch pedal depression degree CRA becomes equal to the predetermined pedal depression degree (YES in step S201), the control valve 54 is closed (step S202). Thereafter, the closed state of the control valve 54 is maintained for a predetermined period (NO in step S203). At this time, the operating state of the clutch mechanism 14 is not changed.

The predetermined period is a period corresponding to one half of the fluctuation cycle at a time when the actual transmission torque periodically fluctuates in accordance with the change of the actual transmission torque. The fluctuation cycle is determined on the basis of the rigidity of the clutch mechanism 14 and the vehicle driving system (for example, the transmission 15, the clutch disc 18, the drive shaft 19 and the like). The predetermined period is previously determined on the basis of the fluctuation cycle and is stored in the electronic controller 30.

If the predetermined period has passed after the control valve 54 is closed (YES in step S203), the control valve 54 is opened (step S204). Accordingly, the operating state of the clutch mechanism 14, that is, the depressed position of the clutch pedal 28 shifts at the maximum speed.

A description will be given below of an operation of the peak suppressing process.

Figure 6A:
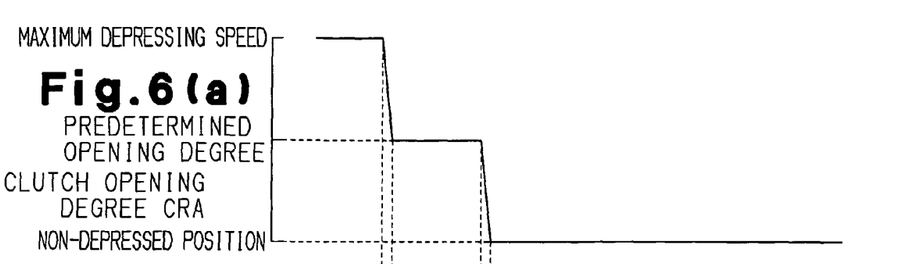
FIG. 6 is a timing chart showing one example of the peak suppressing process.

As shown in FIG. 6, the peak suppressing process is started at time t11. First, the clutch pedal depression degree CRA (FIG. 6(a)) is changed to the predetermined pedal depression degree (time t11 to time t12). Thereafter, the control valve 54 is temporarily closed for the predetermined term, and the clutch pedal depression degree CRA is held at the predetermined pedal depression degree (time t12 to time t13). Thereafter, the control valve 54 is opened, and the clutch pedal depression degree CRA is again changed (time t13 to time t14).

Figure 6B:
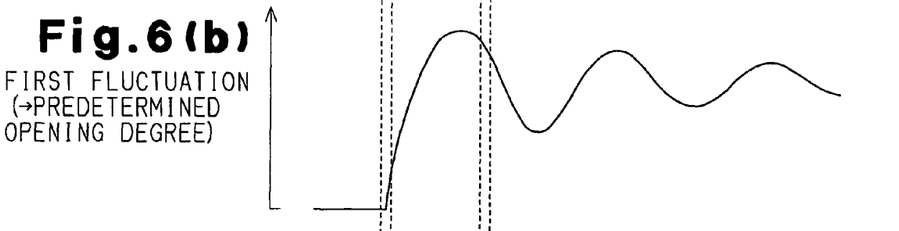
Figure 6C:
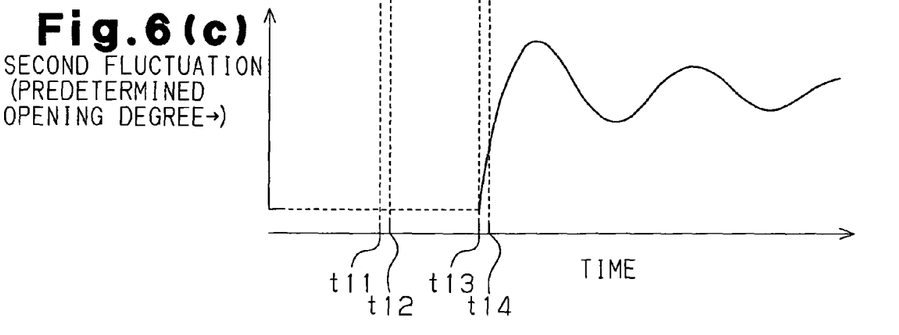

Accordingly, as shown in FIG. 6(b), the periodical fluctuation (the first fluctuation) of the actual transmission torque is generated on the basis of the change of the actual transmission torque generated at a time when the clutch pedal depression degree CRA is changed to the predetermined pedal depression degree. In addition, as shown in FIG. 6(c), the periodical fluctuation (the second fluctuation) of the actual transmission torque is generated on the basis of the change of the actual transmission torque generated at a time when the clutch pedal depression degree CRA is again changed from the predetermined pedal depression degree.

In the present embodiment, as the predetermined period, that is, the period for temporarily stopping the change of the clutch pedal depression degree CRA, there is set time corresponding to one half of the fluctuation cycle at a time of periodical fluctuation. Accordingly, in the first fluctuation and the second fluctuation, the positive and negative of the phase is substantially inverted. Therefore, the first fluctuation and the second fluctuation interfere with each other, and a part of both fluctuations is offset, whereby the peak value of the actual transmission torque is suppressed.

As mentioned above, the actual transmission torque temporarily overshoots the steady state transmission torque and is thereafter repeatedly increased and decreased, the amplitude of the actual transmission torque becomes smaller and smaller, and the actual transmission torque finally coincides with the steady state transmission torque. Accordingly, after the amplitude of the first fluctuation is slightly damped, the first fluctuation and the second fluctuation interfere with each other.

If the amplitudes of both fluctuations are set equal in the initial stage when the first fluctuation and the second fluctuation are generated, the amplitude of the first fluctuation becomes larger than the amplitude of the second fluctuation at a time when both fluctuations interfere with each other. In order to suppress the peak value of the actual transmission torque, it is desirable that the amplitudes of the fluctuations coincide with each other at a time when both fluctuations interfere with each other.

Taking this point into consideration, in the present embodiment, as the predetermined pedal depression degree, there is set the pedal depression degree which is equal to the clutch pedal depression degree CRA capable of transmitting over one half of the maximum value of the steady state transmission torque by the clutch mechanism 14. Accordingly, the amplitude in the initial stage when the first fluctuation is generated becomes larger than the amplitude in the initial stage when the second fluctuation is generated, under the situation that the torque equal to the maximum value of the steady state transmission torque is transmitted at the steady state when the clutch mechanism 14 comes to the engaged state and the actual transmission torque is fixed, in other words, under the situation that there is a risk the peak value of the actual transmission torque becomes maximum.

Further, in the present embodiment, as the predetermined pedal depression degree, there is previously set such the pedal depression degree that the amplitudes of both fluctuations substantially coincide at a time when the first fluctuation and the second fluctuation interfere with each other under the situation mentioned above, on the basis of the result of experiment. Accordingly, when the first fluctuation and the second fluctuation interfere with each other under the situation mentioned above, most of the amplitude of the first fluctuation and the amplitude of the second fluctuation are cancelled, and the peak value of the actual transmission torque is effectively suppressed. Therefore, it is possible to keep down the strength necessary for the vehicle driving system. Accordingly, for example, a cost reduction can be achieved, and the flexibility of the design of the characteristic of the vehicle driving system is increased.

Figure 7:
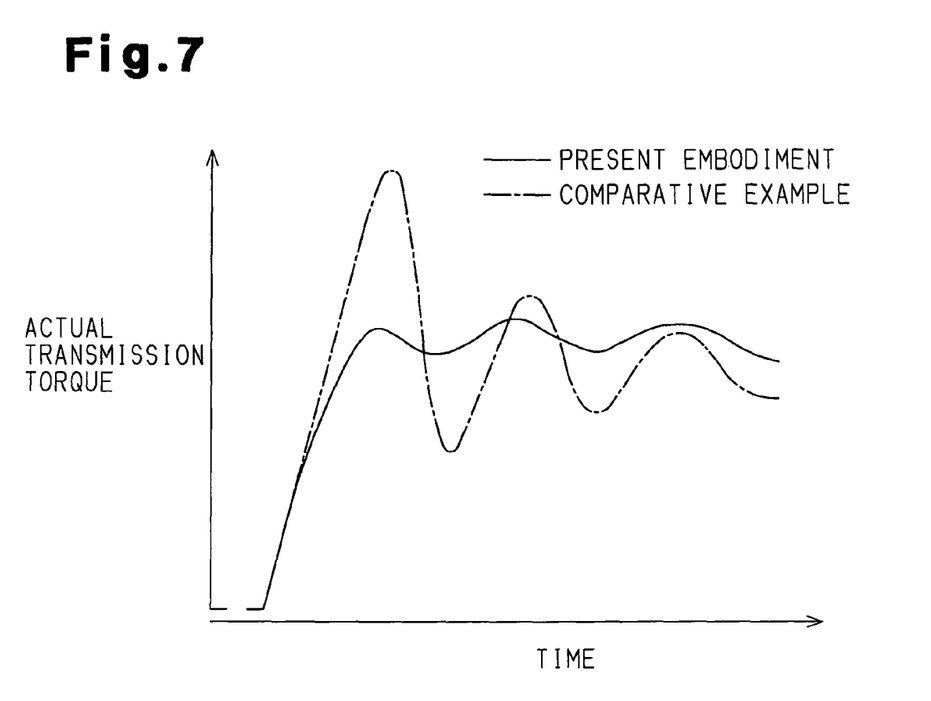
FIG. 7 is a timing chart showing a transition of an actual transmission torque during the peak suppressing process.

As shown by a solid line in FIG. 7, in accordance with the present invention of the present embodiment executing the peak suppressing process, the peak value of the actual transmission torque is suppressed in comparison with the apparatus changing the clutch pedal depression degree CRA as shown by a one-dot chain line in FIG. 7 to the pedal depression degree corresponding to the non-depressed position at the maximum speed.

Even in the case of employing the system in which an orifice is provided in the clutch piping so as to reduce the maximum changing speed of the clutch pedal depression degree CRA, it is possible to lower the peak value of the actual transmission torque. However, in this case, since the changing speed of the clutch pedal depression degree CRA, that is, the changing speed of the operating state of the clutch mechanism 14 is lowered even in the case that the peak value of the actual transmission torque is comparatively small, an unnecessary reduction of the response of the clutch mechanism 14 is caused.

In this regard, in accordance with the present embodiment, the peak value is lowered by executing the peak suppressing process at a time when there is a risk that the peak value of the actual transmission torque becomes large. On the other hand, when the peak value of the actual transmission torque is comparatively small, the reduction of the response of the clutch mechanism 14 is avoided by changing the clutch pedal depression degree CRA at the maximum changing speed without executing the peak suppressing process. It is possible to achieve both the suppression of the peak value of the actual transmission torque and the maintenance of the response of the clutch mechanism 14 by employing the structure mentioned above.

Further, if the clutch mechanism 14 rapidly shifts from the disengaged state to the engaged state, the torque transmitted from the engine 11 to the vehicle driving system becomes large. As a result, there is a case where a phenomenon that the vehicle 10 is swayed forward and backward, or "jerking", occurs. In the present embodiment, since the rapid transition from the disengaged state to the engaged state of the clutch mechanism 14 is suppressed, it is possible to suppress the occurrence of the jerking.

Further, it is possible to smoothly and quickly start the vehicle while avoiding a stall of the engine 11 by intentionally discontinuing a depression of the clutch pedal 28 by, for example, removing the foot from the clutch pedal 28 or sliding the foot in a lateral direction, so that the clutch pedal 28 is rapidly returned to the non-depressed position.

As mentioned above, in accordance with the present embodiment, the following advantages are obtained.

(1) The peak suppressing process is executed at a time when the execution condition is met, in other words, at a time when there is a risk that the clutch mechanism 14 rapidly shifts from the disengaged state to the engaged state. Accordingly, it is possible to keep down the operating speed of the clutch mechanism 14, and it is possible to lower the peak value of the actual transmission torque. Further, when the execution condition is not met, the reduction of the response is suppressed by increasing the maximum operating speed of the clutch mechanism 14 without executing the peak suppressing process.

(2) As the execution condition, there are set the execution stop condition including Condition iii to Condition v. Accordingly, in the case that Condition iii and Condition iv are both met, it is possible to determine that the clutch mechanism 14 has already come to the engaged state so as to determine that the clutch mechanism 14 has got out of the situation where it is desirable to execute the peak suppressing process. Further, in the case that Condition v is met, it is possible to determine that the changing speed of the clutch pedal depression degree CRA is maintained relatively low by the driver so as to determine that the clutch mechanism has got out of the situation where it is desirable to execute the peak suppressing process. It is possible to stop the execution of the peak suppressing process at a suitable timing on the basis of the determination mentioned above.

(3) After changing the clutch pedal depression degree CRA to a predetermined pedal depression degree, the clutch pedal depression degree CRA is held at the predetermined pedal depression degree for the predetermined period corresponding to one half of the fluctuation cycle at a time when the actual transmission torque periodically fluctuates. Further, the clutch pedal depression degree CRA is again changed thereafter. Accordingly, two fluctuations having the substantially inverted positive and negative phases are generated, as the periodical fluctuation of the actual transmission torque. Therefore, it is possible to cause the periodical fluctuations of the actual transmission torque to interfere with each other so as to offset a part of both fluctuations. Accordingly, it is possible to suppress the peak value of the actual transmission torque.

(4) As the predetermined pedal depression degree, there is set the pedal depression degree corresponding to the clutch pedal depression degree CRA capable of transmitting over one half or more of the maximum value of the steady state transmission torque by the clutch mechanism 14. Accordingly, the amplitudes of both fluctuations substantially coincide at a time of the interference between the periodical fluctuation of the actual transmission torque generated at a time when the clutch pedal depression degree CRA is changed to the predetermined pedal depression degree, and the periodical fluctuation of the actual transmission torque generated at a time when the clutch pedal depression degree CRA is again changed from the predetermined pedal depression degree, under the situation that there is a risk that the peak value of the actual transmission torque becomes largest. Accordingly, it is possible to offset most of the amplitudes of the fluctuations, and it is possible to effectively suppress the peak value of the actual transmission torque.

The embodiment mentioned above may be executed with the modifications shown follows.

Instead of detecting the position of the piston of the release cylinder 52, the position of the piston of the master cylinder 51, the position of the clutch pedal 28, the position of the release fork 45, the position of the release bearing 44 or the like may be detected as the value corresponding to the clutch pedal depression degree CRA. In short, the position of any portion that operates in conjunction with the clutch pedal 28 may be used for the peak suppressing process as the value corresponding to the clutch pedal depression degree CRA. Further, the clutch piping 53 may be provided with a flow rate sensor detecting the flow rate of the clutch fluid, and the clutch pedal depression degree CRA may be determined on the basis of the flow rate of the clutch fluid detected by the flow rate sensor.

As far as the sensor capable of determining that the load is applied to the clutch pedal 28 in the depressing direction, various sensors, for example, a load sensor or a strain sensor may be employed as the contact sensor 33. In place of the contact sensor 33, there may be provided a switch in which on and off states are switched at a time when the driver touches the clutch pedal 28.

The predetermined period is not limited to "time corresponding to one half of the fluctuation cycle at a time when the actual transmission torque periodically fluctuates in accordance with the change of the actual transmission torque", but it is possible to set a time which is slightly shorter or slightly longer than the time corresponding to one half of the fluctuation cycle, as the predetermined period. In short, it is possible to determine the period capable of reliably offsetting the first fluctuation and the second fluctuation through an experiment, a simulation, and it is possible to use the thus-determined period as the predetermined term.

The predetermined pedal depression degree may be changed in correspondence to the viscosity of the oil used in the oil lubricating system of the transmission 15, that is, the lubricating oil fed to the interior of the transmission 15. Specifically, it may be configured such that the higher the viscosity of the oil, the closer to the non-depressed position the predetermined pedal depression degree becomes.

The friction force is generated in the sliding portion such as the bearing portion of the input shaft 17 and the like in the transmission 15. The greater the friction force, the greater the damping degree of the fluctuation of the actual transmission torque becomes, and the earlier the reduction of the amplitude of the first fluctuation becomes. Accordingly, in order to reliably cause the amplitude of the first fluctuation to coincide with the amplitude of the second fluctuation, it is desirable that the greater the frictional force, the closer to the non-depressed position the predetermined pedal depression degree becomes. The higher the viscosity of the oil fed to the interior of the transmission 15, the greater the friction force generated in the sliding portion becomes.

In accordance with the structure mentioned above, it is possible to reliably cause the amplitude of the first fluctuation to coincide with the amplitude of the second fluctuation by changing the predetermined pedal depression degree in correspondence to the friction force applied to the sliding portion, and it is possible to effectively keep down the peak value of the actual transmission torque. It is possible to determine that the higher the oil temperature THO, the lower the viscosity of the oil, and it is possible to determine that the more deteriorated the oil, the lower the viscosity of the oil is.

The predetermined pedal depression degree may be changed in accordance with the magnitude of the generated torque of the engine 11. The friction force generated in the sliding portion is changed in correspondence to the magnitude of the actual transmission torque, and the actual transmission torque is changed in correspondence to the magnitude of the generated torque of the engine 11. In accordance with the structure mentioned above, it is possible to change the predetermined pedal depression degree in correspondence to the generated torque of the engine 11, that is, the friction force applied to the sliding portion. Accordingly, it is possible to reliably cause the amplitude of the first fluctuation to coincide with the amplitude of the second fluctuation, and it is possible to more effectively keep down the peak value of the actual transmission torque. The generated torque of the engine 11 can be determined on the basis of the intake air amount GA, the engine speed NE or the like.

The predetermined period may be changed in correspondence to the selected transmission gear. In the multistage transmission 15, the rigidity of the torque transmission path in which the actual transmission torque is transmitted is changed in correspondence to the selected transmission gear. Accordingly, the fluctuation cycle at a time when the actual transmission torque periodically fluctuates in accordance with the change of the actual transmission torque is changed. In accordance with the structure mentioned above, it is possible to set the predetermined period to the period corresponding to one half of the actual fluctuation cycle in correspondence to the change of the fluctuation cycle. Accordingly, it is possible to reliably generate two fluctuations of substantially inverted positive and negative phases, as the periodical fluctuation of the actual transmission torque. Therefore, it is possible to reliably offset the amplitudes of two fluctuations mentioned above, and it is possible to effectively keep down the peak value of the actual transmission torque.

The predetermined period may be changed in correspondence to whether a friction type brake mechanism for forcibly stopping rotation of the output shaft of the transmission 15, each of the portions of the vehicle driving system, such as the drive shaft 19, the axle 21, the drive wheels 22 and the like is being operated. Specifically, the predetermined period may be set shorter in comparison with the case that the friction type brake mechanism is not activated, at the operating time of the friction type brake mechanism, specifically, at a time when the brake pedal 27 is depressed. If the rotation of each of the portions of the vehicle driving system is forcibly stopped on the basis of the operation of the friction type brake mechanism, the rigidity of the torque transmission path becomes higher, and the fluctuation cycle becomes shorter. In this regard, in accordance with the structure mentioned above, it is possible to reliably set the predetermined period to the period corresponding to one half of the actual fluctuation cycle, in correspondence to the operating state of the brake mechanism. Accordingly, it is possible to reliably generate two fluctuations of substantially inverted positive and negative phases, as the periodical fluctuation of the actual transmission torque.

Condition i and Condition ii may be optionally changed as long as the clutch pedal depression degree CRA is the pedal depression degree setting the clutch mechanism 14 to the disengaged state, and it is possible to determine that the changing speed of the clutch pedal depression degree CRA in the engaging direction at a time of setting the clutch mechanism 14 to the engaged state from the disengaged state is equal to or more than the predetermined starting speed.

Condition iii and Condition iv can be optionally changed as long as the clutch pedal depression degree CRA is the pedal depression degree setting the clutch mechanism 14 to the engaged state, and it is possible to determine that the changing speed of the clutch pedal depression degree CRA in the engaging direction at a time of setting the clutch mechanism 14 to the engaged state from the disengaged state is less than the stopping speed.

Condition iv may be omitted. In accordance with this structure, it is possible to determine that the clutch mechanism has got out of the situation where it is desirable to execute the peak suppressing process, through Condition iii or Condition v. Further, both Condition iii and Condition iv may be omitted. In accordance with the structure mentioned above, it is possible to determine that the clutch mechanism has got out of the situation where it is desirable to execute the peak suppressing process through Condition v.

Condition v may be optionally changed as long as it can be determined, using the condition, that the clutch pedal 28 is being operated by the driver.

Condition v may be omitted. In accordance with this structure, it is possible to determine that the clutch mechanism has got out of the situation where it is desirable to execute the peak suppressing process through Condition iii and Condition iv.

The clutch pedal depression degree CRA may be held at a first predetermined pedal depression degree (or a second predetermined pedal depression degree) by temporarily closing the control valve 54 at each of a time when the clutch pedal depression degree CRA comes to the first predetermined pedal depression degree and a time when the clutch pedal depression degree CRA comes to the second predetermined pedal depression degree. Further, the temporary closing operation of the control valve 54 may be executed three or more times. In accordance with this structure, it is possible to periodically fluctuate the actual transmission torque each time when the clutch pedal depression degree CRA is changed. Accordingly, it is possible to cause both fluctuations to interfere with each other, and it is possible to suppress the peak value of the actual transmission torque.

When the clutch pedal depression degree CRA is changed to the predetermined pedal depression degree in the peak suppressing process, and is changed from the predetermined pedal depression degree, the pedal depression degree of the control valve 54 may be made smaller in comparison with the time when the peak suppressing process is not executed. In accordance with the structure mentioned above, it is possible to lower the changing speed of the clutch pedal depression degree CRA by limiting the flow rate of the clutch fluid passing through the clutch piping 53.

As long as it is possible to lower the maximum operating speed of the clutch mechanism 14, that is, the maximum changing speed of the clutch pedal depression degree CRA at a time when the execution condition is met, in comparison with the time when the execution condition is not met, it is possible to optionally change the processing contents of the peak suppressing process.

The present invention may be applied to a vehicle in which the clutch mechanism and the clutch pedal are coupled by a cable and a link mechanism. In this case, there may be provided independently a mechanism for stopping the change of the operating position of the clutch pedal, or a mechanism for lowering the changing speed of the operating position of the clutch pedal, thereby controlling an operation of the mechanism so as to lower the maximum operating speed of the clutch mechanism.

The present invention is not limited to the vehicle provided with the clutch pedal which is operated by a foot of the driver, but may be applied to a vehicle provided with a clutch lever which is operated by a hand.

The present invention is not limited to the control apparatus of the clutch mechanism which is mounted to the vehicle, but may be applied to a control apparatus of a clutch mechanism which is interposed between the power source and the transmission and is coupled to the clutch operating member, and in which the operating mode is changed in conjunction with the change of the operating position of the clutch operating member.

The invention claimed is:

1. A control apparatus of a clutch mechanism, comprising:
a maximum speed lowering device for carrying out a maximum speed lowering process, wherein:
the maximum speed lowering process lowers a maximum operating speed of the clutch mechanism;
the maximum speed lowering device starts the maximum speed lowering process based on an execution start condition,
wherein the execution start condition is a condition in which a changing speed of an operating position of a clutch operating member in an engaging direction at a time of setting the clutch mechanism to an engaged state from a disengaged state becomes equal to or higher than a predetermined starting speed,
wherein the operating position of the clutch operating member is a position setting the clutch mechanism to the disengaged state;
when the maximum speed lowering process is carried out, the maximum speed lowering device changes the operating position of the clutch operating member at a predetermined speed to a predetermined position setting the clutch mechanism to a half-engaged state, and then the maximum speed lowering device holds the operating position at the predetermined position for a predetermined period corresponding to one half of a fluctuating cycle at a time when an actual transmission torque periodically fluctuates in accordance with a change of the actual transmission torque transmitted from a power source to a transmission by means of the clutch mechanism, and then the maximum lowering device again changes the operating position at the predetermined speed; and
the clutch mechanism is coupled to the clutch operating member and is interposed between the power source and the transmission, and the clutch mechanism changes an operating mode in conjunction with the change of the operating position of the clutch operating member.

2. The control apparatus according to claim 1, wherein the predetermined position corresponds to an operating position in which the clutch mechanism is capable of transmitting over one half of the maximum value of a steady state transmission torque transmitted from the power source to the transmission in a steady state where the actual transmission torque is fixed.

3. The control apparatus according to claim 2, wherein the transmission has an oil lubricating system carrying out lubrication through oil fed to the interior of the transmission, and the maximum speed lowering device changes the predetermined position in correspondence to a viscosity of the oil.

4. The control apparatus according to claim 3, wherein the maximum speed lowering device determines that the higher a temperature of the oil is, the lower the viscosity of the oil is.

5. The control apparatus according to claim 3, wherein the maximum speed lowering device determines that the higher a deterioration of the oil is, the lower the viscosity of the oil is.

6. The control apparatus according to claim 2, wherein the maximum speed lowering device changes the predetermined position in correspondence to a magnitude of a generated torque of the power source.

7. The control apparatus according to claim 2, wherein the transmission is a multistage transmission in which a plurality of transmission gears are selectively switched, and the maximum speed lowering device changes the predetermined period in correspondence to a selected transmission gear.

8. The control apparatus according to claim 2, further comprising a friction type brake mechanism for forcibly stopping the rotation of an output shaft of the transmission,
wherein the maximum speed lowering device changes the predetermined period in correspondence to whether the brake mechanism is being operated.

9. The control apparatus according to claim 1, wherein the clutch mechanism and the clutch operating member are coupled via a hydraulic actuation system,
wherein the hydraulic actuation system includes:
a release cylinder brought into contact with the clutch mechanism;
a master cylinder brought into contact with the clutch operating member; and
a piping connecting a liquid chamber of the release cylinder and a liquid chamber of the master cylinder,
wherein a clutch fluid is provided to fill the interior of the hydraulic actuation system, and a control valve for changing a passage cross-sectional area of the piping is provided in the piping, and
wherein the maximum speed lowering device lowers the maximum operating speed of the clutch mechanism by reducing an opening degree of the control valve.

10. The control apparatus according to claim 1, wherein the power source is a vehicle internal combustion engine, and the transmission constructs a vehicle driving system including a drive shaft.

11. The control apparatus according to claim 1, wherein the maximum speed lowering device stops the maximum speed lowering process if at least one of the following conditions is satisfied:
(a) the operating position of the clutch operating member is a position setting the clutch mechanism to the engaged state and the changing speed of the operating position of the clutch operating member becomes less than a predetermined stopping speed; and
(b) the clutch operating member is being operated.

12. The control apparatus according to claim 1, wherein the maximum speed lowering device stops the maximum speed lowering process when the operating position of the clutch operating member is a position setting the clutch mechanism to the engaged state, and the changing speed of the operating position of the clutch operating member in the engaging direction becomes less than the predetermined starting speed.

13. The control apparatus according to claim 1, wherein the maximum speed lowering device stops the maximum speed lowering process if the clutch operating member is being operated.

* * * * *